United States Patent [19]
Taylor et al.

[11] Patent Number: 5,664,214
[45] Date of Patent: Sep. 2, 1997

[54] PARALLEL PROCESSING COMPUTER CONTAINING A MULTIPLE INSTRUCTION STREAM PROCESSING ARCHITECTURE

[75] Inventors: Herbert Hudson Taylor, Pennington; Joseph Edward Peters, Jr., East Brunswick; Danny Chin, Princeton Jct., all of N.J.

[73] Assignee: David Sarnoff Research Center, Inc., Princeton, N.J.

[21] Appl. No.: 605,459

[22] Filed: Feb. 26, 1996

Related U.S. Application Data

[63] Continuation of Ser. No. 228,467, Apr. 15, 1994, abandoned.

[51] Int. Cl.$^6$ .................................................. G06F 15/00
[52] U.S. Cl. .................... 395/800.2; 395/379; 395/381
[58] Field of Search ................................ 395/800, 375, 395/381, 379

[56] References Cited

U.S. PATENT DOCUMENTS

| | | | |
|---|---|---|---|
| 4,344,134 | 8/1982 | Barnes | 364/200 |
| 4,412,286 | 10/1983 | O'Dowd | 364/200 |
| 4,414,624 | 11/1983 | Summer | 364/200 |
| 4,837,676 | 6/1989 | Rosman | 364/200 |
| 5,129,077 | 7/1992 | Hillis | 395/800 |
| 5,175,865 | 12/1992 | Hillis | 395/800 |
| 5,197,140 | 3/1993 | Balmer | 395/400 |
| 5,390,260 | 2/1995 | Bezek | 382/13 |

FOREIGN PATENT DOCUMENTS

| | | |
|---|---|---|
| 0 360 527 A2 | 3/1990 | European Pat. Off. . |
| 0 460 599 A3 | 12/1991 | European Pat. Off. . |

OTHER PUBLICATIONS

Schweberski et al. "A Model of Task Migration in Partitionable Parallel Processing System".

International Conference on Application Specific Array Processors, 1992, Knight et al., "The Sarnoff Engine: A Massively Parallel Computer for High Definition System Simulation", pp. 342–356, especially pp. 346–355.

Computer, Feb. 1992, Siegel et al., "Mapping Computer–Vision–Related Tasks Onto Reconfigurable Parallel–Processing System", pp. 54–63.

Bronson et al. "Experimental Application–Driven Architecture Analysis of SIMD/MIMD Parallel Processing System" IEEE, 1990.

Bridges, "The GPA Machine: A Generally Partitionable MSIMD Architecture", pp. 196–203, IEEE (1990).

Giloi, "The Suprenum Architecture", Conference Papers: Plenary Sessions and Stream A, Conpar 88, British Computer Society (1988).

*Primary Examiner*—Larry D. Donaghue
*Attorney, Agent, or Firm*—William J. Burke

[57] ABSTRACT

An apparatus and a method for combining the characteristics of both single instruction, multiple data stream (SIMD) and multiple instruction, multiple data stream (MIMD) computer architectures into a single parallel processing computer for performing multiple instruction stream processing. Such a parallel processing computer simultaneously performs both MIMD and SIMD operations on various processors within the computer. Additionally, at specified points during program execution, certain processors, i.e., a subset of all the processors, are synchronized. Once synchronized, the processors can exchange data. Moreover, the processors that do not take part in the synchronization continue executing instructions without interruption. The apparatus and method disclosed find applicability in video servers, medical imaging, special effects and animation and location based entertainment systems among other applications.

20 Claims, 5 Drawing Sheets

PARALLEL PROCESSING COMPUTER CONTAINING A MULTIPLE INSTRUCTION STREAM PROCESSING ARCHITECTURE

CROSS REFERENCE TO RELATED APPLICATIONS

This application is a continuation of patent application Ser. No. 08/228,467 entitled PARALLEL PROCESSING COMPUTER CONTAINING A MULTIPLE INSTRUCTION STREAM PROCESSING ARCHITECTURE and filed on Apr. 15, 1994, abandoned.

This application is related to copending application having Attorneys Docket Number DSRC 11347 filed concurrently herewith, entitled "LOCAL SEMIAUTONOMOUS DEDICATED-STORAGE ACCESS FOR PARALLEL PROCESSORS" and to copending patent application Ser. No. 08/091935, filed Jul. 14, 1993 which is a continuation in part of Ser. No. 07/926265 filed Aug. 5, 1992. Each of these applications are commonly assigned with the present invention and incorporated herein by reference.

BACKGROUND OF THE DISCLOSURE

The invention generally relates to parallel processing computers, and, more particularly, to such computers containing a multiple instruction stream processing architecture.

Parallel processing computers are generally designed to implement one of two architectures: (1) Single Instruction Multiple Data stream (SIMD) architecture, and (2) Multiple Instruction Multiple Data stream (MIMD) architecture. A computer having a SIMD architecture is generally referred to as a SIMD computer and a computer having a MIMD architecture is generally referred to as a MIMD computer.

Typically, a parallel processing computer having either architecture contains a plurality of processors coupled to one another by two buses. Specifically, a data bus, carrying a data stream to each processor, and an instruction bus, carrying an instruction stream to each processor. The processors typically share local memory via the data bus such that the processors may share data.

Specifically, in a SIMD computer, a single source program is compiled and executed by all the processors comprising the computer. As such, all the processors simultaneously execute an identical instruction. However, the data supplied via the data bus to each processor differs from processor to processor. The processors in such a system are tightly coupled to maintain synchronous operation of the various processors while each processor independently operates upon its data stream.

In contrast, a MIMD computer has either a single compiled source program executing asynchronously upon each of the processors or has separately compiled source programs executing upon individual processors. Typically, the processors are decoupled and execute instructions independent of the other processors within the computer. As such, to facilitate such independent program execution, most MIMD computers have an instruction memory and program sequencer logic associated with each processor. Also included with each processor, typically on the same chip with the processor, are instruction and data caches. These caches are used to alleviate possible memory bandwidth contention that can arise when multiple processors asynchronously access a shared local memory.

Typically, MIMD computers execute different instructions (or routines of instructions) on different processors using different data streams. After each processor has completed its task (routine or instruction), the processors wait until all the other processors have completed their tasks. Thereafter, the processors are each synchronized to one another and are capable of passing data amongst themselves. Once the exchanged data is available to the processors, i.e., stored in the shared local memory, the processors again independently process this data. This process of repeated independent processing, synchronization, data exchange, independent processing and so on is repeated until the processors have exhausted their instructions.

Recently, to provide both synchronous and asynchronous program execution, computers having combined SIMD/MIMD architectures have been developed. Such combined architecture computers typically operate as SIMD computers for most functions. However, individual processors can be selectively decoupled from the other processors to perform individual tasks, i.e., execute a separate compiled source routine, and provide the result to the other processors. However, to maintain processor synchronization while the MIMD task is being processed, the other processors (those not performing the MIMD task) wait until the MIMD task is complete and, thereafter, all the processors synchronously continue processing. Consequently, processing efficiency in the combined architecture computer is reduced as compared to a solely SIMD or MIMD computer.

Disadvantageously, present mixed architecture computers lack apparatus for easily synchronizing (resynchronizing) the processors to facilitate processing of independent and simultaneous SIMD and MIMD instructions. As such, they are task oriented and must have some processors wait until the MIMD task is complete before continuing with SIMD operations.

Therefore, a need exists in the art for a parallel processing computer capable of asynchronously and simultaneously executing MIMD and SIMD instructions. Such a computer must be capable of receiving and storing MIMD instructions and have a selectable processing mode (SIMD or MIMD mode selection) associated with each processor within the computer.

SUMMARY OF THE INVENTION

The invention overcomes the disadvantages heretofore associated with the prior art mixed architecture computers. Specifically, the invention combines the characteristics of both single instruction, multiple data stream (SIMD) and multiple instruction, multiple data stream (MIMD) architectures into a parallel processing computer for processing multiple instruction streams. As such, a parallel processing computer using the invention simultaneously performs both MIMD and SIMD operations. Additionally, at specified points during program execution, certain processors, i.e., a subset of all the processors within the parallel processing computer, are synchronized. In this manner, the processors can periodically synchronize and exchange data.

The invention contains a plurality of processor subsystems within a parallel processing computer. To facilitate parallel processing, the processor subsystems are interconnected by an instruction bus and a data communications bus. Within each processor subsystem is a local memory, instruction logic and a processor. The instruction logic selects, in response to instructions from a processor controller, whether the processor within a given processor subsystem is to perform SIMD or MIMD operations. Additionally, a processor synchronizer is connected to all the processors in the computer such that certain processors within a dynamically defined subset of processors can be synchronized during computer operations to facilitate intermittent data exchange between the processors within the subset.

BRIEF DESCRIPTION OF THE DRAWING

To facilitate understanding, identical reference numerals have been used, where possible, to designate identical elements that are common to the figures.

DETAILED DESCRIPTION

Figure 1:
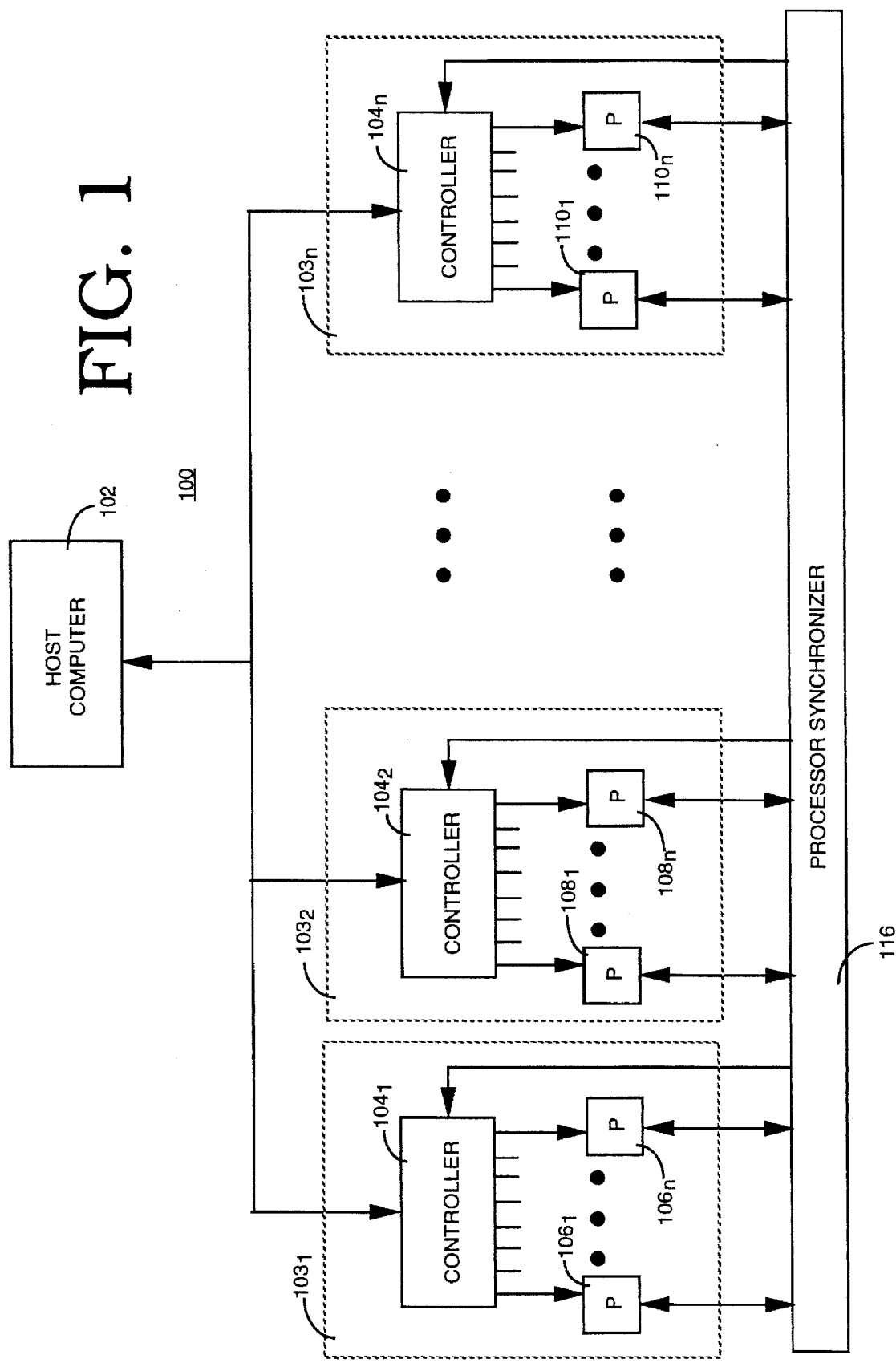
FIG. 1 is a high level block diagram of a parallel processing computer that contains the invention.

FIG. 1 depicts a high level block diagram of a parallel processing computer 100. The computer 100 contains a host computer 102, a plurality of controllers 104n, and, associated with each controller, a plurality of processor subsystems 106n, 108n and 110n. Additionally, the processors are all connected to one another via a processor synchronizer 116. Specifically, a parallel processing computer having this configuration, known as the Sarnoff Engine, has been designed by the David Sarnoff Research Center of Princeton, N.J. The Sarnoff Engine is disclosed in a patent application entitled "Advanced Massively Parallel Computer Apparatus" having Ser. No. 08/091935, filed Jul. 14, 1993 which is a continuation in part of Ser. No. 07/926265 filed Aug. 5, 1992. This application is hereby incorporated by reference.

The Sarnoff Engine is a practical example of type of parallel processing computer that would utilize the invention. In the Sarnoff Engine, there are 64 processors, e.g., processors $106_1$ through $106_{64}$, connected to each controller, e.g., controller $104_1$. Physically, a controller and its 64 processors are mounted on a single circuit card. The circuit cards are illustrated as dashed boxes 103n. Each card contains 16 processor integrated circuits each containing four processors. Each of the four processors is associated with various processor support circuitry, e.g., memory, instruction logic and the like, to produce four processor subsystems on each integrated circuit. The circuit cards are connected to one another via the host computer 102. The host computer 102 generally serves as an interface between the processor subsystems and the programmer or computer user. Additionally, the host computer functions as a main controller that monitors and controls the operation of the various controllers and processor subsystems within the parallel processing computer. In addition to the host computer connecting the circuit cards to one another, the circuit cards are also connected to one another via a processor synchronizer 116 that facilitates synchronizing processors and a data communications bus (not shown, but well known in the art) that facilitates data exchange amongst the processors. Such a computer architecture is easily expanded to increase the computing power of the engine by adding additional circuit cards to the system. Thus, the Sarnoff Engine is said to be scalable.

Although the processor synchronizer 116 is depicted as a separate block from the processor subsystems 106n, 108n, 110n the synchronizer 116 is only depicted in this manner to facilitate understanding of its operation. In practice, the synchronizer is typically an integral part of the subprocessor circuitry. Specifically, the synchronizer is distributed amongst all the processor integrated circuits in the computer. In addition, the distributed portions of the synchronizer are interconnected to form a single unit as described below. Consequently, as more circuit cards are added to the computer, the synchronizer is scaled to accommodate the additional processors. From the following discussion those skilled in the art will realize and understand how to effectively distribute the processor synchronizer 116 amongst the processors.

Figure 2:
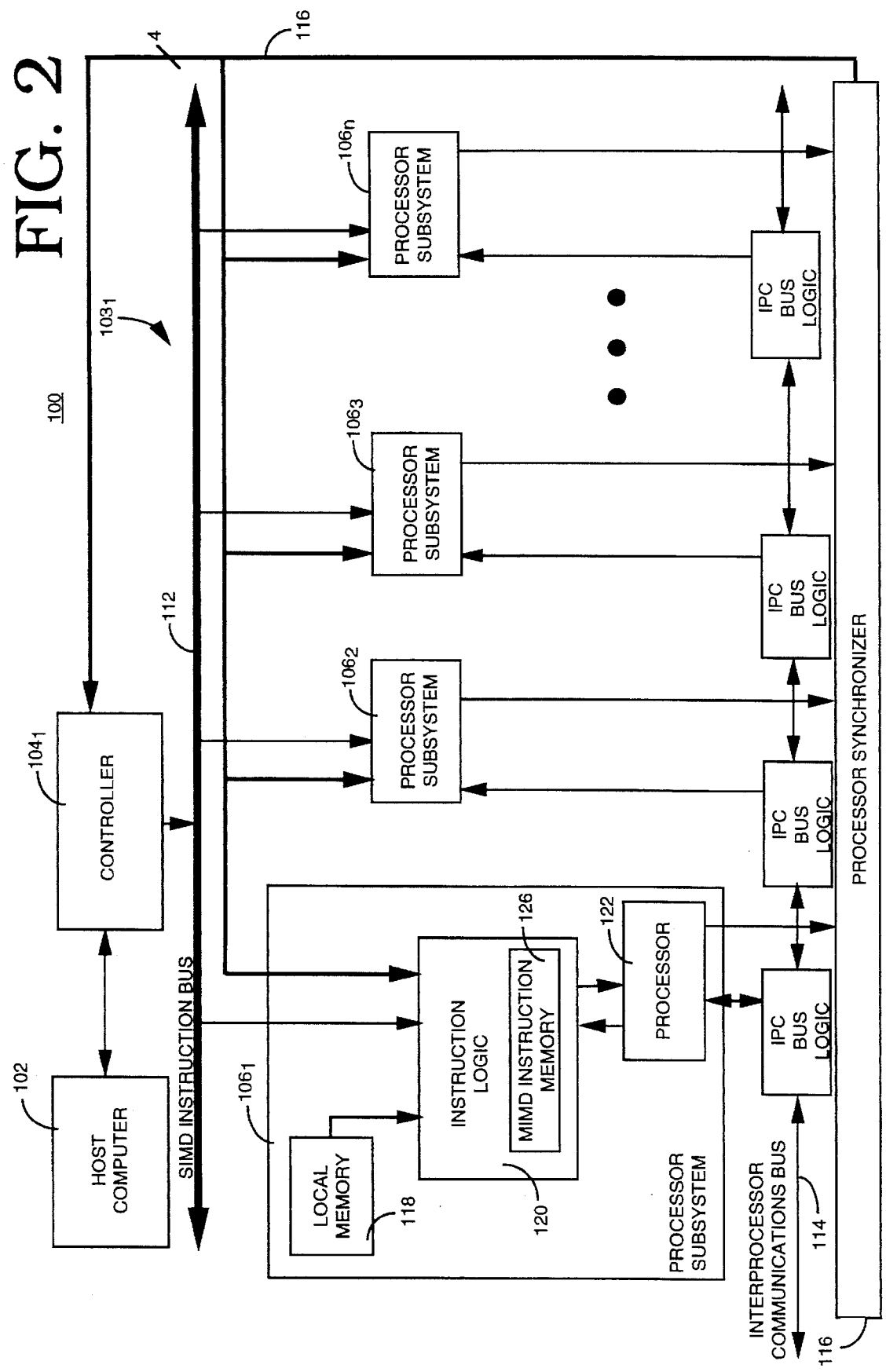
FIG. 2 is a high level block diagram of a specific portion of a parallel processing computer that contains the invention.

FIG. 2 is a high level block diagram of a portion of a computer 100, e.g., a single circuit card of a version of the Sarnoff Engine into which is incorporated a preferred embodiment of the invention. As discussed above, computer 100 contains a host computer 102, a controller $104_1$, a SIMD instruction bus 112, an interprocessor communications (IPC) bus 114 (data bus), a processor synchronizer 116, and a plurality of processor subsystems $106_1$, $106_2$, $106_3$ and 106n. Illustratively, in the Sarnoff Engine, n is 128.

Specifically, the host computer 102 is connected to the controller 104. This controller communicates a series of SIMD instructions to the various processor subsystems. The controller 104 also accomplishes many other functions that are not relevant to the invention. For our purposes, the controller 104 contains a subsystem that contains a SIMD program memory and a program sequencer. As such, a programmer loads, via the host computer, a program into the program memory and the program sequencer accesses each instruction contained in the program. As each instruction is accessed, the instruction is sent (broadcast) to all the processors via the SIMD instruction bus 112. When all the processors are operating in the SIMD mode, each processor subsystem synchronously executes each broadcast instruction. Data, generated by the instruction execution, may be placed upon the IPC bus 114 or may be stored in local processor memory. By sending data to the IPC bus, data from one processor subsystem is made available for other processor subsystems to use when executing a subsequently issued instruction. In the SIMD mode, all the processor subsystems remain synchronized and, as such, the synchronizer is not utilized. However, it should be noted, that other controllers on other circuit cards, may be executing different SIMD instructions. As such, the computer is said to be capable of operating in a multi-SIMD mode as well as a pure SIMD mode. In a pure SIMD mode, all the processor subsystems across the entire computer simultaneously execute the same instructions.

On the other hand and in accordance with the invention, in the MIMD mode, one or more processor subsystems are decoupled from being synchronized to the other processor subsystems. A decoupled processor subsystem then executes a MIMD instruction routine recalled from local memory 118. At some predefined point in the routine, the processor subsystem will need to exchange data with one or more other processor subsystems. To facilitate this data exchange, the decoupled processor is synchronized with one or more processors involved in the data exchange. Once the data exchange is complete, the processor subsystems involved therein can be decoupled to process other MIMD instructions. Importantly, the processors involved in the data exchange do not have to be associated with the same controller. For example, in a Sarnoff Engine incorporating the invention, processor subsystems on different circuit cards can be synchronized.

Specifically, each processor subsystem $106_1$ through $106n$ are identical in construction and function. Therefore, only processor subsystem $106_1$ is shown in any detail. Additionally, although a parallel processing computer may contain hundreds or even thousands of processor subsystems, for simplicity, only four subsystems are shown. Each processor subsystem contains a local memory 118, instruction logic 120 and a processor 122.

Typically, a MIMD routine to be executed is recalled from local memory 118, sent to instruction logic 120 and stored in a MIMD instruction memory 126 for subsequent execution. As such, in this first option for storing a MIMD routine, the MIMD routine is preloaded from local memory into the MIMD instruction memory in anticipation of the processor executing it.

Alternatively, the MIMD routine can be sent to the processor subsystem via the SIMD instruction bus. To facilitate this second option, a MIMD routine can be imbedded within a SIMD routine. The MIMD routine is routed via the SIMD bus to the MIMD instruction memory and stored therein. Typically, the MIMD routine is loaded in the MIMD memory in this manner before processor run time is begun.

In a third option for storing MIMD instructions, the MIMD instructions to be stored in the MIMD memory are contained within a SIMD instruction stream. Using a special instruction, the SIMD instruction stream instructs the instruction logic 120 to transfer instructions from the SIMD instruction bus to a MIMD instruction memory 126. However, these same instructions are also sent to the processor for execution. Consequently, the MIMD routine is stored in MIMD instruction memory. Once the MIMD routine is stored, the instruction logic 120 disconnects the SIMD instruction bus 112 from the memory 126. One advantage of tiffs arrangement is that while the MIMD instructions are being stored, they can also be, but are not necessarily, executed by the processor 122, i.e., the MIMD instructions might be passed through the instruction logic 120 as well as stored in memory 126. As such, no processing cycles are "wasted" loading a MIMD routine from the SIMD instruction bus 112.

The instruction logic 120 controls which instruction, MIMD or SIMD, is transferred to the processor 122. As necessary, the instruction logic either selects the SIMD instruction from the SIMD instruction bus 112 to be executed by the processor 122 or, alternatively, the instruction logic selects instructions from the MIMD instruction memory 126 and ignores those instructions from the SIMD instruction bus 112. A special instruction embedded in the SIMD instruction stream instructs the instruction logic when to switch from SIMD to MIMD mode. When in the MIMD mode, the processor 122 is disassociated from the other processors and executes independent MIMD instructions without regard to instructions being executed by the other processors. Importantly, the other processors simultaneously are executing SIMD and/or MIMD instructions. Once the processor 122 completes its execution of the MIMD routine, the processor must be resynchronized with the other processors to enable data to be exchanged with other processor subsystems. As such, the processor 122 sends a signal to the processor synchronizer 116 when it has completed the MIMD function (or reached a point in the routine where data needs to be exchanged with other processors) and is awaiting resynchronization. A detailed discussion of the synchronizer and its operation is presented below.

Figure 3:
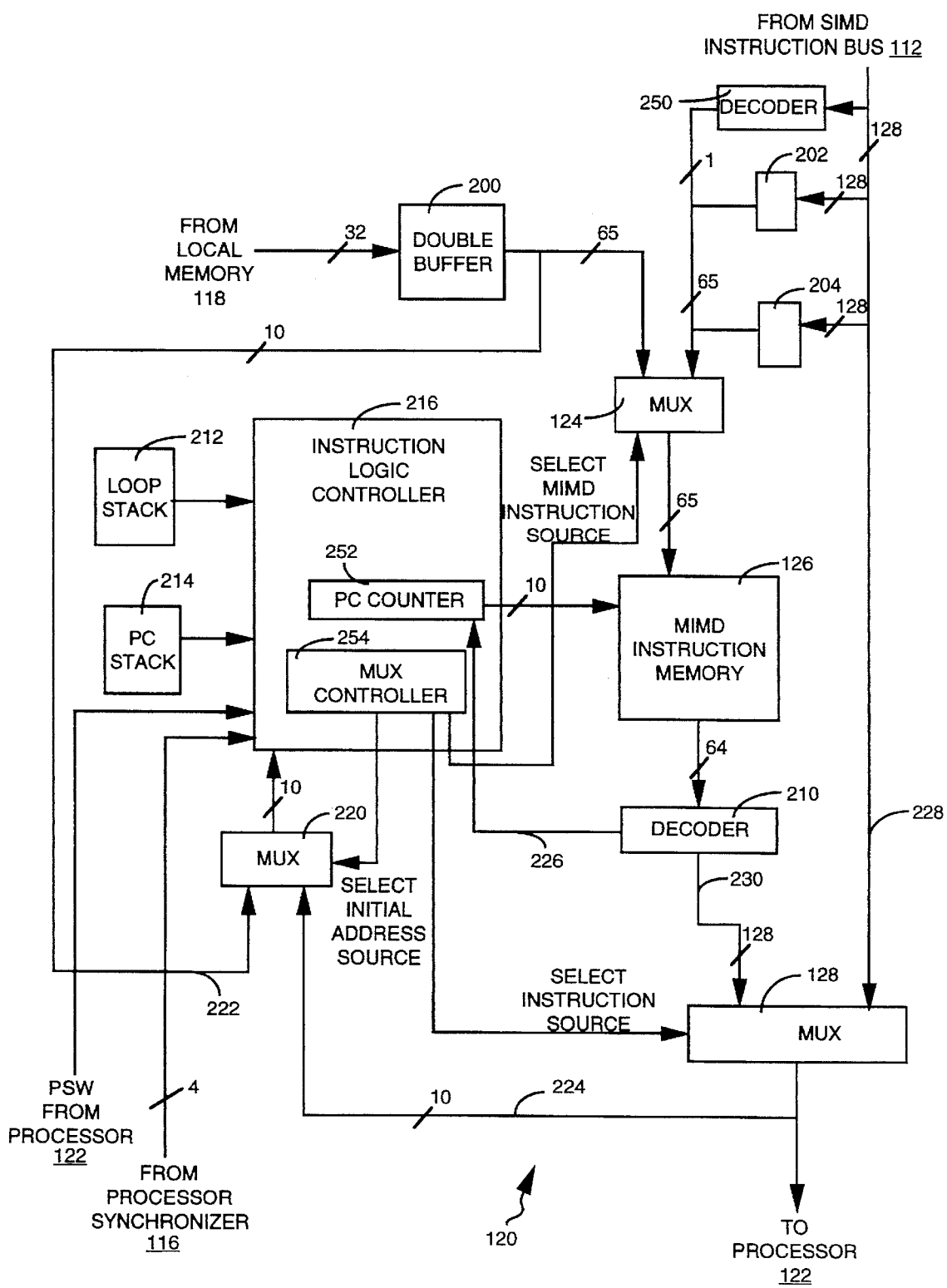
FIG. 3 is a block diagram of a preferred embodiment of inventive SIMD/MIMD instruction logic that forms a portion of the invention.

FIG. 3 is a detailed block diagram of the instruction logic 120 shown in FIG. 2. The following discussion will discuss the instruction logic in the context of being used in a parallel processing computer having a similar design as that of the Sarnoff Engine. From this discussion and illustrative computer, those skilled in the art will be able to utilize the invention in other parallel processing computers.

Illustratively, the SIMD instruction stream used in conjunction with the inventive apparatus contains a series of 128-bit words and the MIMD instructions are encoded to be 64-bit words. Therefore, to facilitate storage of MIMD instructions embedded in the SIMD instruction stream, encoders 202 and 204 are used to encode the 128-bit SIMD words into 64-bit MIMD words. Alternatively, the MIMD instructions can be encoded during compiling of the SIMD program. As such, the encoders 202 and 204 are replaced with buffers which convert the 128 bit words (containing two, concatenated 64-bit MIMD instruction words) into a series of individual 64-bit words. The use of 64-bit MIMD instructions is a physical limitation of the "on board" RAM within each integrated circuit within the Sarnoff Engine. Specifically, the 64-bit instructions are used to enable a greater member of MIMD instructions to be stored in a limited sized on-board RAM. If the RAM were of a greater capacity, the MIMD instructions could then be a series of 128-bit words, the MUX 124 could be a 129-bit MUX and the MIMD memory 126 could then store 128-bit words. As such, the conversion and/or translation processes would not have to be accomplished and the SIMD instruction bus 112 could be connected directly to the MUX 124.

On the other hand, the MIMD routine can also be loaded into the MIMD memory 126 from the local memory 118. Illustratively, the word length available from the local memory is 32-bits. The MIMD memory 126, as stated above, stores 64-bit words. Therefore, double buffer 200 is used to convert the 32-bit words into 64-bit words. An additional bit (write enable bit) is added to produce a 65-bit input to the MUX 124. The write enable bit is passed through the MUX to the MIMD instruction memory to enable that memory to write the MIMD instructions from local memory therein.

To produce a write enable bit from the SIMD instruction bus, an instruction decoder 250 monitors the SIMD instruction stream for a particular instruction. When the particular instruction occurs, the decoder asserts its output line, i.e., a write enable bit. This bit, when added to the 64-bits from decoders 202 and 204, forms a 65-bit input to the MUX 124. This bit is passed to the MIMD memory to enable it to write the MIMD instructions from the SIMD instruction bus.

To switch from accepting MIMD instructions on the SIMD bus to accepting instructions from the local memory, the instruction logic controller produces a SELECT MIMD INSTRUCTION SOURCE signal from its MUX controller. The MUX controller monitors the PSW from the processor to produce the SELECT MIMD INSTRUCTION SOURCE signal. Specifically, the MUX controller monitors a bit in the PSW that, when asserted, informs the MUX controller that the processor has executed an instruction that has set this MIMD instruction source selection bit. In response, the MUX controller either asserts or deasserts the SELECT MIMD INSTRUCTION SOURCE signal. The MUX 124 uses this signal to control its input selection. As such, when the signal is not asserted, the MUX connects the SIMD stream to the MIMD instruction memory and, when the signal is asserted, the MUX connects the double buffer to the MIMD instruction memory.

Importantly, MIMD routines can be loaded from the local memory into the MIMD instruction memory while the processor 122 executes SIMD instructions. This feature is very important when the MIMD instruction memory is manufactured on the same integrated circuit as the processor and memory space is limited. In such a situation, the MIMD routines (or portions of routines) can be loaded into the MIMD instruction memory just prior to the routine being executed, i.e., in a just-in-time approach. Consequently, after a first MIMD routine is executed, the processor will typically execute a number of SIMD instructions (or lock and execute a number of conventional no operation instructions (NOPs)) prior to the next MIMD routine being executed. During this SIMD instruction execution period, a second MIMD routine can be stored in the MIMD instruction memory and can be executed when needed. In this manner, the processor is always executing instructions and does not wait for the MIMD instructions to be available. Consequently, processor utilization efficiency is much improved over that of the prior art.

As discussed above, MUX 124 selects, in response to the SELECT MIMD INSTRUCTION SOURCE signal, either the MIMD instructions originating from the SIMD instruction stream of those MIMD instructions originating from the local memory. In either instance, each MIMD instruction word is stored in MIMD instruction memory 126. An instruction logic controller 216 controls the specific location within the MIMD instruction memory that each instruction is stored. In operation, an initial 10 bit address is used to preset a conventional program counter (PC counter) 252 within the instruction logic controller with the first memory location into which the first MIMD instruction word is stored. Thereafter, the counter 252 increments by one address location for each instruction in a given routine. As such, a routine is stored within a contiguous block of memory locations. The initial address is supplied either by 10-bits in a word from the local memory (path 222) or by 10-bits in a word from a SIMD instruction (path 224) proceeding the MIMD routine within the SIMD instruction stream. The INITIAL ADDRESS SOURCE signal selects the input of MUX 220 to apply to the address generator 216 as the initial address. The INITIAL ADDRESS SOURCE signal is generated by a MUX controller 254 within the instruction logic controller.

Specifically, the MUX controller 254 monitors a processor status word (PSW) generated by the processor 122. The PSW is a 32-bit word that is typically stored in a register associated with each processor. The PSW contains information concerning the present state of the associated processor, i.e., the processor state after executing the last operation. Typically, information concerning Arithmetic Logic Unit (ALU) operation, address generation, and processor state are found in the PSW. As discussed above, the PSW also contains bits that control the MUXes in the instruction logic. Specifically, in addition to the bit that selects the MIMD instruction source, the PSW contains a bit that is asserted to select the source of the starting address of a MIMD routine or instruction in response to the particular program function being executed.

More specifically, when it is necessary to recall a MIMD routine from the MIMD instruction memory, the INITIAL ADDRESS SOURCE signal selects the 10-bit address on line 226 as the initial address. This address is typically made available upon completion of the previously executed MIMD instruction. As such, this address points to the location in memory that the next MIMD instruction is located, e.g., the 10-bit address is the address of the first instruction of the next routine to be executed. When necessary, the PC counter, in response to signals from a conventional loop stack and program counter (PC) stack, increments the addresses to appropriately recall the MIMD instructions stored in the MIMD instruction memory. Alternatively, this 10-bit address can also be used to "jump" to a new instruction location within a currently executing routine. In either case, as the 64-bit encoded instructions are recalled from memory 126, decoder 210 decodes the instructions and produces 128-bit executable instructions. Typically, decoder 210 is a conventional programmable logic array (PLA). Furthermore, decoder 210 monitors the instruction stream for special instructions such as pop, push, jump, loop stack, PC counter load, and the like. In response to these instructions, the decoder alters the output address of the PC counter. Consequently, as is conventional in programming, lines of program code within the program can control the execution order of the instructions within the program.

MUX 128 selects, in response to an INSTRUCTION SOURCE signal, either the SIMD instructions on line 228 or MIMD instructions on line 230. The INSTRUCTION SOURCE signal is generated by the MUX controller 254 in response to a third MUX control bit in the PSW. This third bit is asserted in response to a specific conditional instruction being executed by the processor. As such, when this special instruction is executed, the bit is asserted in the PSW to inform the instruction logic to switch from SIMD mode to MIMD mode. Consequently, the next instruction executed by the processor will be a MIMD instruction recalled from the MIMD instruction memory.

Figure 4A:
FIGS. 4A-4D depict illustrative program models that can be supported by a parallel processing computer that utilizes the invention.

Using parallel processing computer described above, a program can be executed in many different ways. FIGS. 4A–4D show illustrative program models that can take advantage of the invention. For example, FIG. 4A depicts a conventional SIMD program operation. In this case, the SIMD instructions are broadcast on the SIMD instruction bus and those instructions are sequentially executed by the various processor subsystems.

Figure 4B:
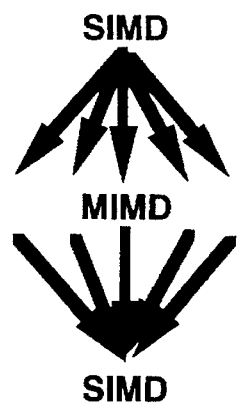

FIG. 4B depicts a program model wherein a SIMD operation is terminated in lieu of individual ME operations executed on a plurality of processor subsystems. Once the MIMD operation is complete on all the processor subsystems, the SYMD operation is continued.

Figure 4C:
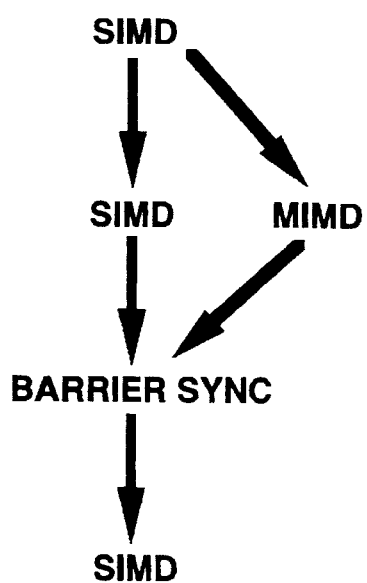

FIG. 4C depicts a program model wherein a SIMD operation is partially terminated in lieu of a SIMD operation executing on some processor subsystems and one or more individual MIMD operations executing on other processor subsystems. At some point in the SIMD operation and after the MIMD operations are complete, all the processor subsystems are synchronized. Thereafter, the SIMD program continues. The method and apparatus utilized to implement the synchronization (known as barrier synchronization) is discussed in detail below.

Figure 4D:
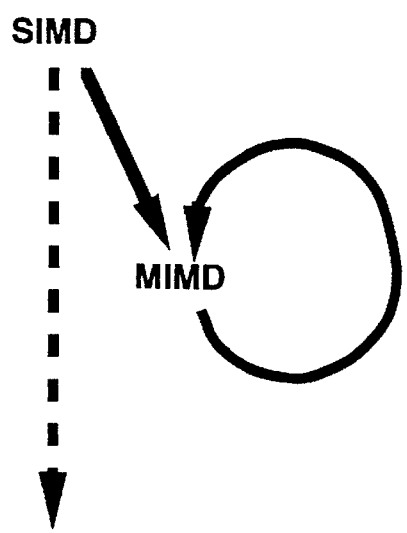

FIG. 4D depicts a program model wherein a SIMD operation is executed on a number of processor subsystems while a MIMD operation is repeatedly executed on one or more other processor subsystems. These repetitive operations are continued while the remainder of the processor subsystems execute MIMD instructions. One example of a MIMD routine well suited for this program model is an error processing routine. In such a routine, the MIMD routine would execute whenever an error was generated by a processor executing the SIMD instructions. As such, the remaining processor subsystems can continue operation while the error is processed separately using the MIMD routine. Once processed, results can be sent to a computer screen or corrective action can be taken by the host computer. In either instance, the processor subsystem assigned to execute the error processing routine will then wait for the next error before executing once again.

Barrier synchronization is a method by which processors that have asynchronously executed a MIMD instruction or routine are resynchronized to one another and to the processors that have been executing SIMD instructions. In general, when a processor completes a MIMD routine or when the processor reaches a specified point in a routine, the processor signals the completion by changing the state of four special bits in the PSW associated with that processor. When all the special bits from all the processors (or a subset thereof) are similarly set, synchronizer circuitry deems the processors with appropriately set bits as synchronized. Thereafter, these processors can exchange data via the IPC bus and synchronously execute SIMD instructions. In this manner, all the processors or a select group of processors can be synchronized.

Figure 5:
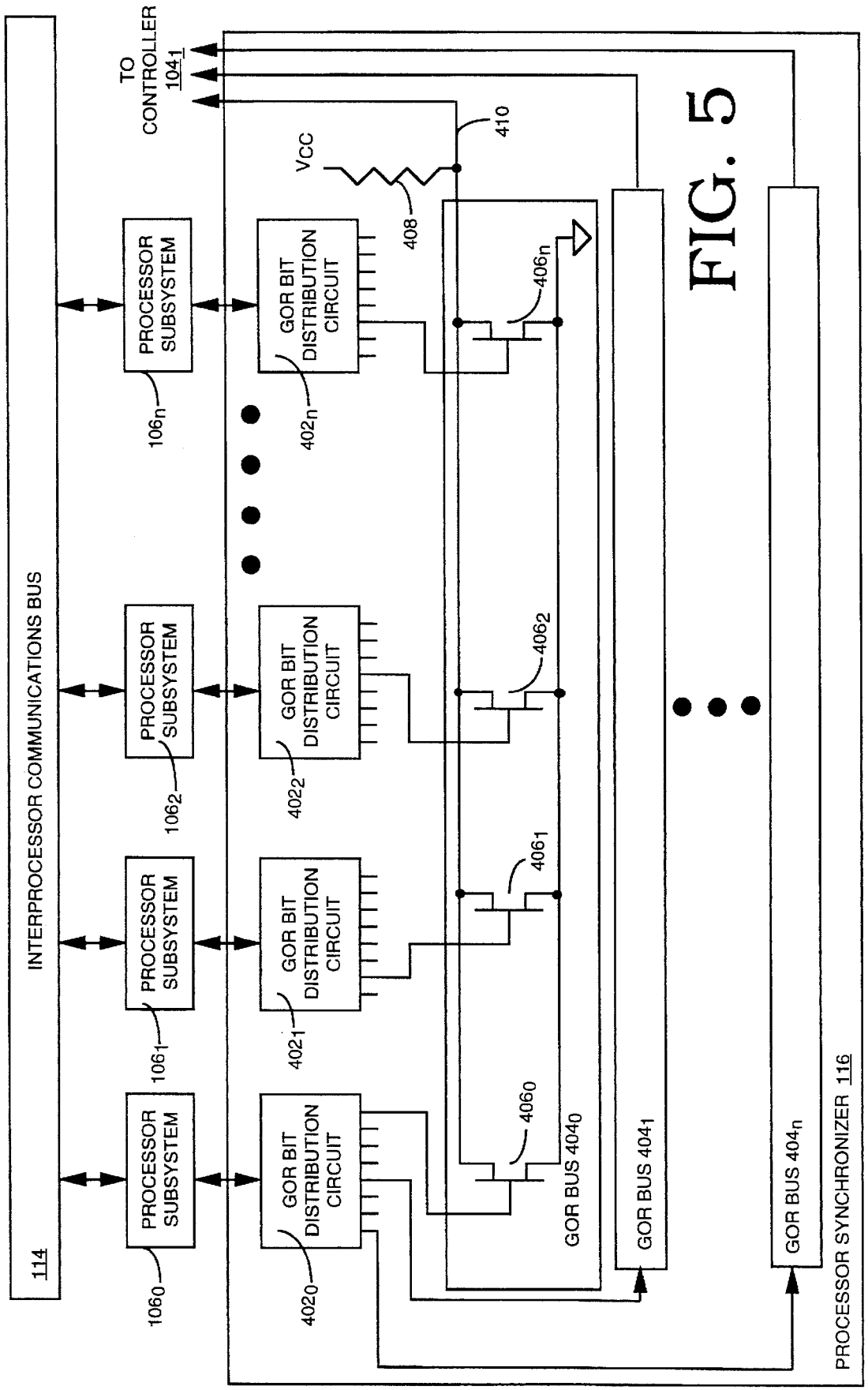
FIG. 5 depicts a block diagram of a processor synchronizer that forms a portion of a preferred embodiment of the invention.

Specifically, FIG. 5 depicts a detailed block diagram of the processor synchronizer 116. Once execution is complete (or at some specific point during program execution) and communication with other processor subsystems is necessary, a processor subsystem 106 changes the state of four special bits in the PSW known as a Global OR (GOR) bits. The state of each of these bits are sent to a global bit distribution circuit 402 wherein the bits are transferred to one of a plurality of lines. Each line extending from the global bit distribution circuit 402 connects to a different GOR bus 404.

In operation, each processor subsystem, as it reaches a predefined point within its program, asserts the GOR bits within its PSW. For example, when the processor subsystem $106_1$ attains a predefined point in its MIMD program, it asserts the GOR bits and halts execution of its processor, i.e., the processor locks and performs NOPs. Further, if processor subsystem $106_0$ later attains its predefined synchronization point, this processor subsystem also asserts its GOR bits. The GOR bits are distributed to one or more GOR buses via the GOR bit distribution circuits $402_0$ and $402_1$. Each of these circuits is programmed to selectively distribute the GOR bits to facilitate synchronization of a given processor subsystems with other subsystems. Once synchronized, the GOR bus informs the controller of the synchronization and, thereafter, the controller unlocks the synchronized processors such that they can execute further instructions.

For example, if, to facilitate program execution, processor subsystem $106_0$ must exchange data with processor subsystem $106_1$, then at some point during program execution these two processor must become synchronized with one another. As such, these two processors form a synchronization subset of processor subsystems (hereinafter referred to as a processor subset). Upon setting of the GOR bits, one GOR bit from each of these two processor subsystems would be transferred to one of the GOR buses, e.g., GOR bus $404_0$. To facilitate synchronization within the processor subset, only the GOR bits from the processors within the subset participate, through the GOR bit distribution circuits 402, in formation of a subset. In this manner, a GOR bit distribution circuits and a GOR bus define membership in a processor subset.

Specifically, within each GOR bus 404 are a series of parallel connected field effect transistors 406 having their gate terminals connected to a GOR bit distribution circuit 402. Further, the drain terminals of all the transistors within a single bus are connected in parallel to ground and the source terminals are connected in parallel to a pull-up resistor 408. As discussed above, the GOR bit for each processor subsystem is initially set to a high value and is then deasserted when the synchronization point is reached in the program. As such, the transistors that are connected to a processor subsystem, via its respective GOR bit distribution circuit, is initially turned on. All the gates of transistors not connected to a processor subsystem via a GOR bit distribution circuit are pulled to a low value by a respective distribution circuit. Consequently, a line 410 connecting all the transistor sources to one another is initially pulled low as long as one processor within the processor subset has not reached its synchronization point.

Returning to the example, initially, all the transistor gates are pulled low, except the gate terminals of transistors $406_0$ and $406_1$ which are presently at a high state. In response, line 410 has a low state. When processor subsystem $106_1$ reaches its synchronization point within a program, it deasserts its GOR bit which, in turn, turns transistor $406_1$ off. However, since processor subsystem $106_0$ has not deasserted its GOR bit, line 410 remains low. When processor subsystem $106_0$ reaches its synchronization point and deasserts its GOR bit, transistor $406_0$ is turned off and line 410 becomes asserted. Assertion of line 410 indicates to the controller that all the processor subsystems within the processor subset defined by GOR bus $404_0$ are synchronized and can now exchange information. To facilitate data exchange, the processors in the subset are unlocked by there respective controllers and permitted to interact with their associated IPC bus logic. Through the IPC bus, data is exchanged amongst the synchronized processor subsystems.

By using GOR bit distribution circuitry 402 in combination with a plurality of GOR buses 404, the processor synchronizer 116 can synchronize any combination of processor subsystems 106. Thus, various subsets of processors can be grouped to perform certain MIMD tasks and then synchronized to exchange data. Thereafter, the processor subsystems can be regrouped into other subsets to perform tasks and exchange data with other processor subsystems. As such, the processor subsystems can be flexibly and dynamically organized to perform a variety of parallel tasks.

In one version of the Sarnoff Engine that incorporates this invention therein, there are four GOR buses. Each of the four GOR bits in the PSW is associated with one of the GOR buses. The GOR bit distribution circuits either connect the GOR bit to an associated bus or do not make such a connection, i.e., either the processor participates in one or more of the subsets or does not. As such, at any instant in time, the computer may define four processor subsets. In this practical example, each GOR bit distribution circuit and its four associated transistors in the four GOR buses are located within each processor integrated circuit.

The IPC bus 114 is an illustrative data communications bus used in various versions of the Sarnoff Engine, and described in detail in patent application Ser. No. 08/091935, filed Jul. 14, 1993 and in Ser. No. 07/926265 filed Aug. 5, 1992, for exchanging data between processor subsystems. The specific manner in which data is distributed along the bus is not relevant to the invention. In fact, those skilled in the art will realize that there are many bus arrangements that could be used to distribute data amongst synchronized processor subsystems.

Although one embodiment incorporating the teachings of the invention has been shown and described in detail herein, those skilled in the art can readily devise many other varied embodiments that still incorporate these teachings.

The apparatus and method disclosed herein find applicability in video servers, medical imaging, special effects and animation and location based entertainment systems among other applications.

What is claimed is:

1. In a parallel processing computer having a plurality of processor subsystems interconnected by an instruction bus for carrying a composite instruction stream containing first type instructions and second type instructions, where each processor subsystem contains apparatus comprising:

means, connected to said bus, for extracting said second type instructions from said composite instruction stream;

a second type instruction memory for storing said second type instructions as the second type instructions are extracted from said composite instruction stream;

a local memory for storing second type instructions; and a local memory multiplexor, connected to said local memory and said extracting means, for selecting whether said second type instructions from said bus are stored in said second type instruction memory or said second type instructions from said local memory are stored in said second type instruction memory.

2. The apparatus of claim 1 wherein said first type instruction is an instruction from a single instruction multiple data (SIMD) program.

3. The apparatus of claim 1 wherein said second type instruction is an instruction from a Multiple Instruction Multiple Data (MIMD) program.

4. The apparatus of claim 1, further comprising:

a multiplexor, connected to said second type instruction memory and said bus, for selecting whether said composite instruction stream from said bus or said second type instructions from said second type instruction memory are available for execution.

5. The apparatus of claim 4 further comprising:

a processor, coupled to said multiplexor, for asynchronously executing said second type instructions while, simultaneously, other processors synchronously execute said first type instructions; and means, connected to said processor and said other processors, for synchronizing, after said processor asynchronously executes said second type instructions said processor with one or more of said other processors.

6. The apparatus of claim 5 wherein said synchronizing means further comprises:

means, within said processor, for generating an indicator signal indicating when said processor requires synchronization with said other processors;

means for selecting a subset of said other processors for synchronization; and means for indicating when all of said processor and said subset of other processors are synchronized.

7. The apparatus of claim 6 wherein said selecting means further comprises means for selectively connecting ones of said other processors within the subset of other processors to said indicating means.

8. The apparatus of claim 7 wherein said indicating means further comprises a bus interconnecting all of the processors that, in response to said indicating signals generated by said processor and each of said processors in said subset of other processors, generates a signal when all of said indicating signals are generated by said processor and said subset of other processors.

9. The apparatus of claim 8 wherein said bus further comprises:

a plurality of field effect transistors containing a drain terminal, a gate terminal and a source terminal;

each of said drain terminals connected to one another and to ground potential;

each of said source terminals connected to one another and connected to a voltage through a pull-up resistor;

each gate terminal connected to said subset selecting means;

said signal indicating that said processor and said other processors within said subset of other processors are synchronized is produced when all of said gate terminals have the same voltage.

10. In a parallel processing computer having a plurality of processor subsystems interconnected by an instruction bus for carrying a composite instruction stream containing first type instructions and second type instructions, where each processor subsystem contains apparatus comprising:

means, connected to said bus, for extracting said second type instructions from said composite instruction stream;

a second type instruction memory for storing said second type instructions as the second type instructions are extracted from said composite instruction stream a multiplexor, connected to said second type instruction memory and said bus, for selecting whether said composite instruction stream from said bus or said second type instructions from said second type instruction memory are available for execution;

a processor, coupled to said multiplexor, for asynchronously executing said second type instructions while, simultaneously, other processors synchronously execute said first type instructions;

means, connected to said processor and said other processors, for synchronizing, after said processor asynchronously executes said second type instructions, said processor with one or more of said other processors;

a local memory for storing second type instructions; and a local memory multiplexor, connected to said local memory and said extracting means, for selecting whether said second type instructions from said bus are stored in said second type instruction memory or said second type instructions from said local memory are stored in said second type instruction memory.

11. The apparatus of claim 10 wherein said synchronizing means further comprises:

means, within said processor, for generating an indicator signal indicating when said processor requires synchronization with said other processors;

means for selecting a subset of said other processors for synchronization; and means for indicating when all of said processor and said subset of other processors are synchronized.

12. The apparatus of claim 10 wherein said selecting means further comprises means for selectively connecting ones of said other processors within the subset of other processors to said indicating means.

13. The apparatus of claim 12 wherein said indicating means further comprises a bus interconnecting all of the processors that, in response to said indicating signals generated by said processor and each of said processors in said subset of other processors, generates a signal when all of said indicating signals are generated by said processor and said subset of other processors.

14. The apparatus of claim 13 wherein said bus further comprises:

a plurality of field effect transistors containing a drain terminal, a gate terminal and a source terminal;

each of said drain terminals connected to one another and to ground potential;

each of said source terminals connected to one another and connected to a voltage through a pull-up resistor;

each gate terminal connected to said subset selecting means;

said signal indicating that said processor and said other processors within said subset of other processors are synchronized is produced when all of said gate terminals have the same voltage.

15. In a parallel processing computer having a plurality of processor subsystems interconnected by an instruction bus for carrying a composite instruction stream containing first type instructions and second type instructions, a method comprising the steps of:

extracting said second type instructions from said composite instruction stream;

storing said second type instructions in a second type instruction memory as the second type instructions are extracted from said composite instruction stream;

storing second type instructions within a local memory; and selecting whether said second type instructions from said bus are stored in said second type instruction memory or said second type instructions from said local memory are stored in said second type instruction memory.

16. The method of claim 15, further comprising the step of selecting whether said composite instruction stream from said bus or said second type instructions from said second type instruction memory are available for execution.

17. The method of claim 15 wherein said first type instruction is an instruction from a single instruction multiple data (SIMD) program.

18. The method of claim 15 wherein said second type instruction is an instruction from a multiple instruction multiple data (MIMD) program.

19. The method of claim 15 further comprising the steps of:

asynchronously executing said second type instructions on a processor while, simultaneously, other processors sychronously execute said first type instructions; and synchronizing, after said processor asynchronously executes said second type instructions, said processor with one or more of said other processors.

20. The method of claim 19 wherein said synchronizing step further comprises the steps of:

generating an indicator signal indicating when said processor requires synchronization with said other processors;

selecting a subset of said other processors for synchronization; and indicating when all of said processor and said subset of other processors are synchronized.

* * * * *